United States Patent [19]
Shreeve et al.

[11] Patent Number: 5,467,921
[45] Date of Patent: Nov. 21, 1995

[54] THERMOSTAT HAVING SHORT CIRCUIT PROTECTION

[75] Inventors: William O. Shreeve, Huntington, Ind.; Laurie L. Werbowsky, Jamesville, N.Y.; Thomas W. Essig, Fort Wayne, Ind.

[73] Assignee: Carrier Corporation, Syracuse, N.Y.

[21] Appl. No.: 311,230

[22] Filed: Sep. 23, 1994

[51] Int. Cl.⁶ .............................. H02H 3/00; G05D 15/00
[52] U.S. Cl. ........................ 236/78 R; 236/46 R; 361/93
[58] Field of Search ........................... 236/1, 78 R, 46 R; 165/12; 361/93

[56] References Cited

U.S. PATENT DOCUMENTS

| | | | |
|---|---|---|---|
| 4,544,981 | 10/1985 | Hakoopian | 361/93 |
| 4,860,154 | 8/1989 | Fazlollahi | 361/93 X |
| 5,115,643 | 5/1992 | Hayata et al. | |

Primary Examiner—William E. Wayner

[57] ABSTRACT

An electronic thermostat having a short circuit protection feature has a controller which sends control signals to circuitry used for activating and deactivating a system for conditioning air. Short circuit protection circuitry monitors the circuitry within the thermostat and indicates to the controller when a short circuit has occurred. When a short circuit is detected, the controller sets its control signal to deactivate the system for conditioning air for a predetermined period of time.

15 Claims, 1 Drawing Sheet

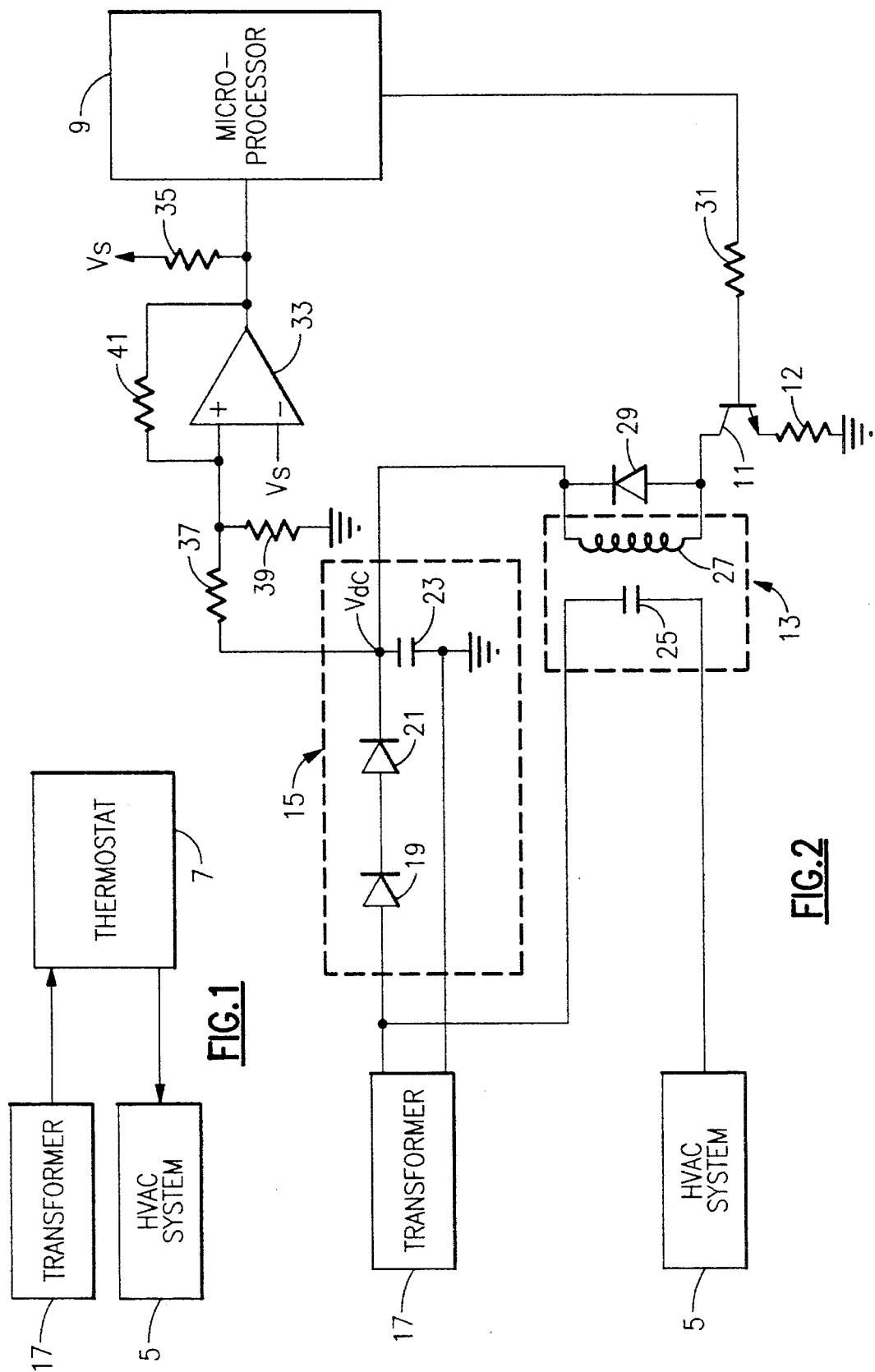

5,467,921

THERMOSTAT HAVING SHORT CIRCUIT PROTECTION

BACKGROUND OF THE INVENTION

This invention relates to an electronic thermostat having a controller for normally controlling the activation of a heating or cooling system. In particular, this invention relates to utilizing the controller to eliminate a short circuit condition when a short circuit is detected in the thermostat.

Heating, ventilation and air conditioning (HVAC) systems are commonly used in homes and commercial establishments to provide temperature controlled environments. Generally, a thermostat is used to manually set a desired temperature in an area heated or cooled by the HVAC system. The thermostat includes a controller which controls the activation of the HVAC system. Thus, if the temperature in the area being heated or cooled has deviated from the desired temperature set on the thermostat, the controller will send a signal which will turn on the HVAC system.

During the installation of an HVAC system, there are occasions when wires connected to the thermostat are incorrectly attached by a worker or are accidently crossed at some point. Thus, the thermostat must be designed to handle temporary problems produced by such situations in order to ensure safe and reliable performance. One problem which is commonly created by crossed or switched wires is a short circuit. The short circuit produces large current flow through the printed circuit traces of the thermostat and, if not accounted for, the short circuit could result in a fire or permanent damage to the thermostat.

In order to properly protect thermostats from short circuit conditions, it has been therefore known to expand the widths of the printed circuit traces in the thermostat that carry the potentially large current flow. These traces must be of sufficient width to at least carry the large current flow until a fuse associated with the printed circuit traces is blown. The above solution to handling short circuit conditions is becoming increasingly more difficult to implement as thermostats become smaller and more compact. In this regard, the necessity of maintaining the widened printed circuit traces as a safety precaution reduces the ability to create more compact thermostats even though the widened printed circuit traces are only needed during short circuit conditions. In addition, since this method of protecting against short circuits allows current to flow until a fuse is blown, there is an added cost associated with replacing the fuse each time a short circuit occurs.

SUMMARY OF THE PRESENT INVENTION

It is an object of this invention to provide a thermostat having a safe and reliable mechanism to handle short circuit conditions.

It is a further object of this invention to allow for more compact thermostats by minimizing the necessary size of the printed circuit traces used within each thermostat.

It is a further object of this invention to reduce the frequency of fuse replacement and costs associated therewith, by detecting and handling a short circuit prior to blowing a fuse.

According to the present invention, an electronic thermostat having a controller which sends a control signal to circuitry for activating a system for conditioning air, furthermore includes short circuit protection circuitry which indicates to the controller when a short circuit condition has occurred and causes the controller to set the control signal to deactivate the activating circuitry for a predetermined period of time.

The short circuit protection circuit preferably includes rectifying circuitry wherein the rectifying circuitry creates a direct current voltage which is monitored by detecting circuitry. When the detecting circuitry detects that the direct current voltage has dropped below a predetermined value, the detecting circuitry indicates to the controller that a short circuit has occurred. The controller can thereafter deactivate the activating circuitry so as to eliminate the short circuit. The detecting circuitry also preferably includes a feedback loop used to stabilize the output of the detecting circuitry following a short circuit condition.

Additional objects and features of the invention will be apparent from consideration of the detailed description of the invention taken together with the accompanying drawings, in which:

BRIEF DESCRIPTION OF THE DRAWINGS

FIG. 1 is a block diagram showing a transformer feeding a stepped down voltage to a thermostat controlling an HVAC system;

FIG. 2 is a circuit diagram for the electronic thermostat of FIG. 1.

DESCRIPTION OF THE PREFERRED EMBODIMENT

Referring to FIG. 1, a heating, ventilation and air conditioning (HVAC) system 5 is shown to be controlled by a thermostat 7. The thermostat is used to set a desired temperature in an area being heated or cooled by the HVAC system and receives its power from a transformer 17. The transformer is used to step down voltage from a home or office A.C. outlet prior to feeding the thermostat.

As shown in FIG. 2, the thermostat includes a microprocessor 9 which sends a control signal that controls the active state of the HVAC system based on whether an area being heated or cooled by the HVAC system has deviated from the desired temperature set on the thermostat. The microprocessor controls the active state of the HVAC system through a switching transistor 11 which is connected to a relay 13, as is discussed hereinafter.

As furthermore shown in FIG. 2, rectifying circuitry 15 is used to rectify an AC voltage produced at the output of the transformer 17. The rectifying circuitry consists of a first diode 19, a second diode 21, and a capacitor 23. The two diodes 19, and 21 are connected in series and connect the output of the transformer to one end of the capacitor 23. The other end of the capacitor 23 connects to ground. It is to be noted that the point where the diode 21 and the capacitor 23 connect will hereinafter be referred to as a DC voltage equal to $V_{dc}$.

The relay 13 consists of a relay contact 25 and a relay coil 27. One end of the relay contact connects to the transformer 17 while the other end of the relay contact connects to the HVAC system. The relay coil is connected at one end to the voltage $V_{dc}$, and on the other end to the collector of the transistor 11. In addition, a diode 29 is connected in parallel with the relay coil and serves to protect the transistor from any large positive voltage produced by the relay coil when the transistor switches off. However when the transistor is on, the relay coil produces a magnetic field across the relay contact 25 which closes the relay contact and allows current to flow to the HVAC system.

As shown in FIG. 2, the transistor 11 has its emitter connected to ground through a resistor 12 and a base connected to the microprocessor 9 through a resistor 31. Thus, when the microprocessor determines the temperature in the area being heated or cooled has deviated from the temperature set at the thermostat, the microprocessor will send a control signal to the base of the transistor which will bias it on. This will allow current to flow through the relay coil 27 and activate the HVAC system.

A comparator 33 has an open collector output connected to the microprocessor which is used to indicate to the microprocessor when a short circuit is detected. A pull-up resistor 35 connected to the open collector output of the comparator maintains a high voltage level at the microprocessor when no short circuit is detected. A resistor 37 connects the positive input terminal of the comparator to the voltage $V_{dc}$. Additionally, a resistor 39 connects between the positive input terminal and ground. Thus, the resistors 37 and 39 serve as a voltage divider for the positive input of the comparator 33 creating a voltage potential at this input approximately equal to $V_{dc}*(R_{39}/(R_{37}+R_{39}))$, wherein $R_{37}$ is the resistance of the resistor 37 and $R_{39}$ is the resistance of the resistor 39. The negative input of the comparator is connected to a supply voltage $V_s$.

A resistor 41 creates a feedback loop between the output of the comparator 33 and the positive input of the comparator. This feedback loop is used to provide hysteresis which helps stabilize the comparator's output after it triggers so that small fluctuations at the positive input terminal of the comparator will not cause repeated triggering of the comparator.

The operation of the circuitry in response to a short circuit will now be described. A short circuit will occur if the end of the relay contact 25 going to the HVAC system is accidentally connected to ground and the relay 13 turns on. This will cause the voltage $V_{dc}$ to drop. The rate at which the voltage, $V_{dc}$, will drop is defined by the capacitor 23. The capacitor 23 is preferably sized so that the divided voltage, $V_{dc}* (R_{39}/(R_{37}+R_{39}))$ will drop below the supply voltage, $V_s$, within a certain period of time. This period of time must be short enough so as to not allow a high current produced by the short circuit condition to degrade the printed circuit traces of the thermostat. The time period may be arrived at empirically by subjecting the thermostat circuitry to the short circuit condition and noting how long the circuitry can withstand the high current produced by the short circuit condition. The resulting period of time may be shortened to take into account other considerations such as for instance design margins.

When the voltage level at the positive input terminal of the comparator drops below the voltage level $V_s$, the output of the comparator will go low indicating to the microprocessor that a short circuit has occurred. After receiving an indication that a short circuit has occurred, the microprocessor sends a control signal to the transistor 11 which turns off the relay 13 for preferably fifteen seconds. When the relay turns off, the relay contact 25 opens creating an open circuit in the path of current flow previously created by the short circuit thus preventing potential damage to the thermostat. When the fifteen second period of time expires, the microprocessor will again generate a control signal to the transistor 11 turning the relay 13 on. If the relay 13 continues to experience the aforementioned short circuit condition, than the output of the comparator 33 will again drop low within three hundred milliseconds prompting the microprocessor to again send a control signal to the transistor 11 turning off the transistor 11 for the predetermined period of time. This process of activating and deactivating the transistor 11 via a control signal from the microprocessor will continue as long as the short circuit condition remains present.

It is to be appreciated that while a thermostat having a short circuit protection feature has been described for use with a relay, the above described invention can also be incorporated into other thermostat designs. Additionally, it should be understood by those of ordinary skill in the art that various modifications may be made to the present invention without departing from the spirit or scope of the general inventive concept as defined by the appended claims and their equivalents.

What is claimed is:

1. A thermostat for controlling activation of a system for conditioning air, said thermostat comprising:

activating circuitry connected to said system for conditioning air for activating said system for conditioning air;

a controller connected to said activating circuitry, said controller generating a control signal for said activating circuitry so as to cause said activating circuitry to activate or deactivate said system for conditioning air; and short circuit protection circuitry connected to said controller, said short circuit protection circuitry indicating to said controller when a short circuit condition has occurred so that said controller sets the control signal to deactivate said activating circuitry for a predetermined period of time.

2. The thermostat of claim 1 wherein said short circuit protection circuitry comprises:

rectifying circuitry producing a direct current voltage which is monitored to determine if a short circuit has occurred.

3. The thermostat of claim 2 wherein said short circuit protection circuitry further comprises:

short circuit detecting circuitry for monitoring said direct current voltage, said short circuit detecting circuitry being operative to indicate to said controller when said direct current voltage passes through a predetermined level.

4. The thermostat of claim 3 wherein said short circuit detecting circuitry comprises:

a comparator which receives a signal representative of said direct current voltage and indicates to said controller that a short circuit has occurred when said signal representative of said direct current voltage passes through a predetermined reference voltage.

5. The thermostat of claim 4 wherein said short circuit detecting circuitry further comprises:

a feedback circuit connecting the output of said comparator with the input of said comparator which receives the signal representative of said direct current voltage so as to stabilize the output of said comparator following a short circuit condition.

6. The thermostat of claim 3 wherein said short circuit detecting circuitry comprises:

voltage responsive circuitry wherein said voltage responsive circuitry produces a signal proportional to said direct current voltage.

7. The thermostat of claim 6 wherein said short circuit detecting circuitry further comprises:

a comparator connected to said voltage responsive circuitry so as to receive the signal from said voltage responsive circuitry, said comparator being furthermore operatively connected to a reference voltage defining a threshold voltage level whereby said comparator will indicate to said controller that a short circuit is sensed when the signal produced from said voltage responsive circuitry passes through said threshold voltage level.

8. The thermostat of claim 7 wherein said voltage responsive circuitry comprises:

a feedback circuit connected to said voltage responsive circuitry for feeding back the voltage level condition at the output of said comparator so as to change the signal produced from said voltage responsive circuitry following a short circuit condition thereby stabilizing the output of said comparator.

9. The thermostat of claim 1 wherein said controller comprises a programmable processor generating a bilevel control signal normally triggering said activating circuitry at a given signal level.

10. The thermostat of claim 9 wherein said short circuit protection circuitry comprises:

bilevel signaling circuitry operatively connected to said microprocessor for indicating to said processor when a short circuit condition has occurred so that said processor can deactivate said activating circuitry for said predetermined period of time.

11. The thermostat of claim 1 wherein said activating circuitry includes:

signal transmitting circuitry for transmitting a predefined signal level activating said system for conditioning air; and a switching transistor connected to said signal transmitting circuitry for switching the signal level on or off in response to the control signal from said controller.

12. A method for controlling a system for conditioning air comprising the steps of:

normally activating the system for conditioning air by a control signal sent from a controller when a sensed temperature varies from a setpoint temperature;

detecting a short circuit condition in circuitry associated with the system for conditioning air; and setting the control signal from the controller so as to deactivate said system for conditioning air when a short circuit is detected.

13. The method of claim 12 wherein said step of detecting a short circuit condition in circuitry associated with the system for conditioning air comprises the steps of:

discharging a capacitor;

comparing a voltage produced by the discharging capacitor with a predefined voltage level; and sending a short circuit signal to the controller when the voltage produced by the discharging capacitor passes through the predefined voltage level.

14. The process of claim 12 further comprising the step of:

generating a control signal at the controller which deactivates the system for a predetermined period of time in response to receipt of the short circuit signal to the controller when a short circuit is detected.

15. The method of claim 12 further comprising the step of:

opening the current path from a power source supplying voltage to the system for conditioning air when the control signal generated by the controller is set to deactivate the system for conditioning air.

\* \* \* \* \*